Jan. 16, 1962

M. GARBUNY 3,017,458

APPARATUS FOR REDUCING SPURIOUS SIGNALS
IN THERMAL IMAGE CONVERTER

Filed Oct. 29, 1956

2 Sheets-Sheet 1

INVENTOR.
MAX GARBUNY
BY
ATTORNEY
AGENT

INVENTOR.
MAX GARBUNY

United States Patent Office 3,017,458
Patented Jan. 16, 1962

3,017,458
APPARATUS FOR REDUCING SPURIOUS SIGNALS IN THERMAL IMAGE CONVERTER
Max Garbuny, Pittsburgh, Pa., assignor, by mesne assignments, to the United States of America as represented by the Secretary of the Air Force
Filed Oct. 29, 1956, Ser. No. 619,094
4 Claims. (Cl. 178—6.8)

This invention relates to image converters of the type utilizing the principle of temperature variation of photoemission and has as its object a reduction in the effect of inherent nonuniformities of the photoemissive surface.

Image converters of the above type have a photoemissive surface composed of a material the photoemissivity of which varies with temperature, and means or forming an image thereon of a source or sources of radiation in the infrared region. As a result the temperature over the photoemissive surface and its photoemissivity vary in accordance with the incident energy distribution in the infrared image. When the photoemissive surface is scanned by a spot of light, the resulting photoemissive current varies in accordance with the infrared image. However, this current also has undesired variations due to inherent nonuniformities in the photoemissive surface. In accordance with the invention this difficulty is overcome by taking advantage of the fact that photoemissive surfaces of the above type have a threshold wavelength above which the photoemission is a function of temperature but below which the photoemission is relatively insensitive to temperature or, in some cases, may vary with temperature in the opposite sense. Therefore, if the photoemissive surface is scanned by two spots of light, one of wavelength above and the other of wavelength below the threshold wavelength, the difference in the resulting two photoemissive currents is substantially free of the effect of surface irregularities.

Figure 1:
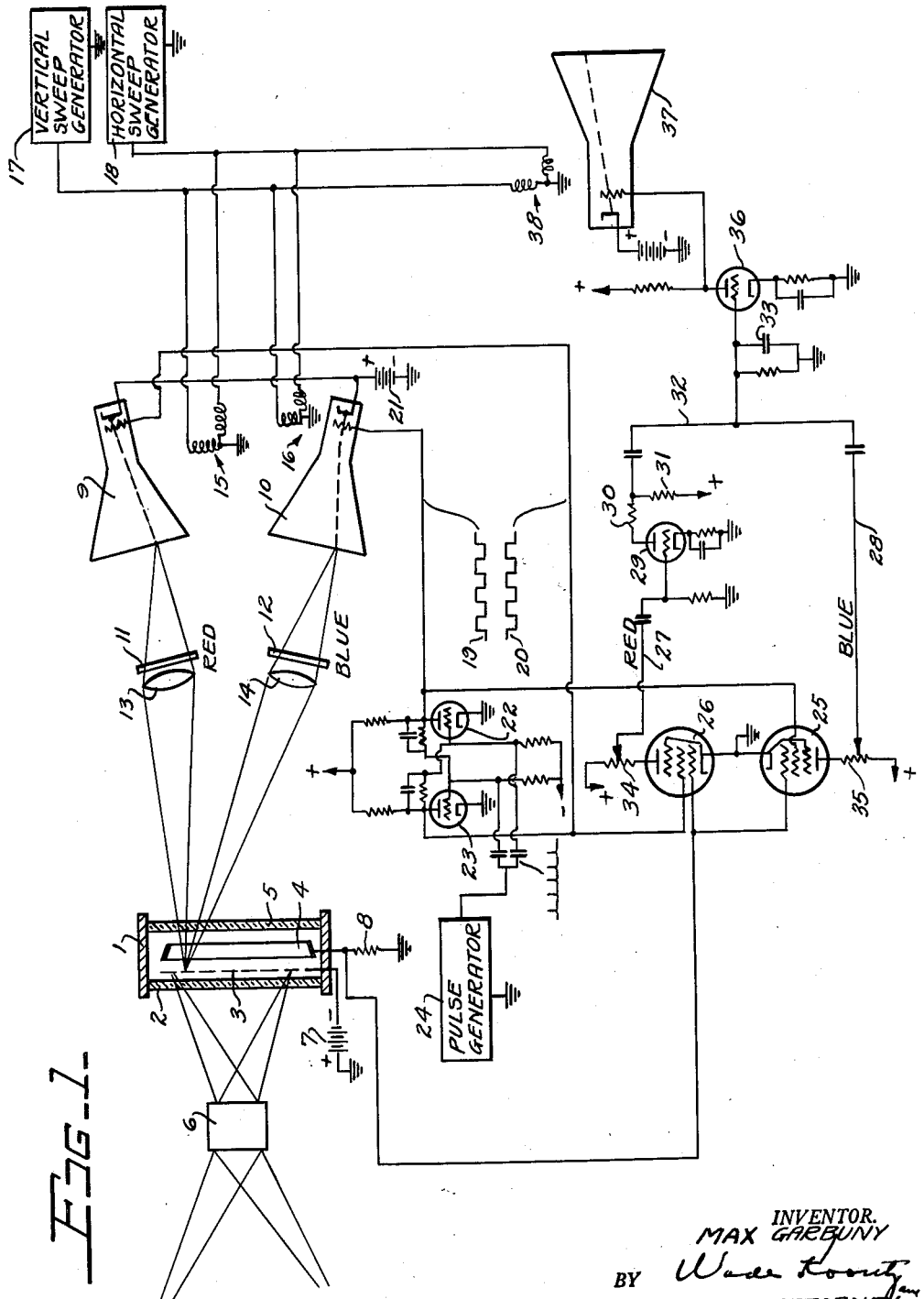

A more detailed description of the invention will be given in connection with the specific embodiment thereof shown in the accompanying drawings, in which FIG. 1 is an embodiment of the invention in which the two scanning spots of different wave length are obtained from separate cathode-ray tubes; and FIG. 2 differs from FIG. 1 in that the two scanning spots are derived from a single cathode-ray tube using polarized light techniques.

Referring to FIG. 1, the evacuated cell 1 has an infrared transmitting window 2, of silver chloride for example, a semipermeable thermally sensitive photoemissive cathode 3, a collector electrode 4, and a glass window 5. When an infrared image is formed on the left-hand surface of cathode 3, as by lens system 6, and the right-hand surface is scanned by a spot of light of wave length greater than the threshold wavelength of the cathode material, photoelectrons are emitted from the right surface in numbers directly related to the temperature of that area of the cathode beneath the scanning spot. These electrons are collected by electrode 4, which is maintained at a positive potential relative to the cathode by voltage source 7, and the resulting current in resistor 8 varies, as the cathode is scanned in accordance with the temperature distribution over the cathode surface.

In the embodiment shown the cathode 3 is of the cesium-antimony type which has a positive temperature coefficient with respect to red light, but the photoemission of which is relatively insensitive to temperature changes in the case of blue light. The right-hand surface of cathode 3 is scanned by red and blue spots of light through the use of cathode-ray tubes 9 and 10, red and blue filters 11 and 12 and lenses 13 and 14 which form images of the fluorescent screens of the cathode-ray tubes on the cathode 3. The electron beams of the cathode-ray tubes scan synchronously by having their deflection systems 15 and 16 energized from common sources of deflection voltages 17 and 18. The positions of the red and blue spots are therefore superimposed, however, the red and blue illuminations occur in succession due to the alternate pulsing of cathode-ray tubes 9 and 10 by oppositely phased square waves 19 and 20 applied to their grids. Each of the cathode-ray tubes is biased beyond cut-off by source 21 except during the more positive half-cycle of the square wave applied to its grid. With a scanning spot of finite dimensions the ratio of the horizontal distance traveled by the spot during one cycle of rectangular waves 19—20 to its horizontal dimension, or diameter in the case of a circular spot, is proportional to both the period of the rectangular wave and the horizontal sweep velocity. Therefore, by appropriate choice of these two parameters this ratio can be made much less than unity so that successive scanning spots of different wavelengths overlap to a high degree. With a large overlap, succcessive red and blue illuminations occur in substantially the same spot on the cathode 3. Also the decay time of the cathode-ray tube phosphors is short relative to the half-period of the square waves so that simultaneously illumination in the two colors is reduced to a minimum.

The square waves 19 and 20 are obtained at the anodes of tubes 22 and 23 which are connected in a bi-stable or Eccles-Jordan circuit. This circuit has two conditions of stability in one of which tube 22 is fully conductive and tube 23 is cut off, and in the other of which the situation is reversed so that tube 23 is fully conductive and tube 22 is cut off. The circuit may be switched from one condition to the other by the application of a positive pulse to the grid of the nonconductive tube. By applying a series of positive pulses from any suitable generator 24 to the grids of both tubes simultaneously, as shown in the drawing, the circuit is alternately switched between its two stable states generating square waves 19 and 20.

The square waves 19 and 20 are also used to switch the video signal at resistor 8 to the signal subtraction circuit in synchronism with the alternate red and blue illuminations of cathode 3. For this purpose, square waves 19 and 20 are applied to the screen grids of tubes 25 and 26, respectively, and the video signal at resistor 8 is applied to the parallel connected control grids of these tubes. Since the anodes of tubes 22 and 23 are near ground potential when the tubes are fully conductive, the screen grids of tubes 25 and 26 are below anode cut-off during the more negative half-cycles of the applied square waves and the tubes are inoperative as amplifiers. During the more positive half-cycles the screen potentials are sufficiently high for anode conduction to occur and amplification to take place. Considering for the moment that resistor 8 is short circuited so that no video signal is applied to the control grids of tubes 25 and 26, negative-going pulses appear alternately at the anodes of these tubes due to the positive-going pulses that are alternately applied to their screen grids from tubes 22 and 23. In the absence of a video signal, these alternate negative-going pulses, which appear on conductors 27 and 28, are of equal amplitudes, assuming equal amplification in tubes 25 and 26, or may be made to have equal amplitudes by appropriate adjustment of potentiometers 34 and 35.

Consider now that the short circuit is removed from resistor 8 but that no thermal image is present on the photocathode 3. As the photocathode is scanned a video signal appears across resistor 8 due to the varying photoemission of the cathode that results from its nonuniformity. The presence of this video signal on the control grids of tubes 25 and 26 causes the magnitudes of the negative-going pulses to be increased in proportion to the video signal magnitude. However, since, as pointed out above, the photoemission in the absence of a thermal image is independent of the color of the scanning spot and since the photoemission of the cathode during successive red and blue scanning spots occurs from substantially the same elemental area, the increments in successive "red" and "blue" negative-going pulses appearing on conductors 27 and 28 are the same. Therefore the difference between successive pulses occurring alternately on these conductors remains zero.

Now consider the operation of the device under normal conditions with a thermal image on photocathode 3. As already stated, the photoemission of the cathode is directly influenced by temperature under red illumination but not under blue illumination. Therefore, the magnitudes of the "red" negative-going pulses on conductor 27 are further increased in proportion to the increase in photoemission due to the thermal image temperature but the "blue" negative-going pulses are unaffected. Consequently, the difference in the magnitudes of successive pulses alternately occurring on conductors 27 and 28 is proportional to the temperature of the particular elemental area of the thermal image.

From the foregoing it is seen that nonuniformity of the photocathode produces no difference in the magnitude of successive pulses on conductors 27 and 28 while the presence of a thermal image produces a magnitude difference which varies over the scanning cycle in accordance with the temperature variation in the image. Therefore, if the difference in the successive pulses on conductors 27 and 28 is continuously derived over the scanning cycle the result is a video signal representative of the thermal image and unaffected by photocathode irregularities. In order to produce this difference signal, the "red" negative-going pulses on conductor 27 are inverted by stage 29, the gain of which is reduced to unity by potentiometer 30—31, to produce "red" positive-going pulses of equal magnitude. Therefore, with "red" positive-going pulses on line 32 and "blue" negative-going pulses on line 28 alternately applied to condenser 33, the net effect on the voltage across this condenser is proportional to the difference in the magnitudes of these pulses. This signal, after amplification by tube 36, is applied to the control grid of cathode-ray tube 37 the sweep of which is synchronized with that of cathode-ray tubes 9 and 10 by energizing its deflection system 38 from sweep generators 17 and 18. A visual image corresponding to the thermal image on photocathode 3 is therefore produced on the screen of tube 37.

Figure 2:
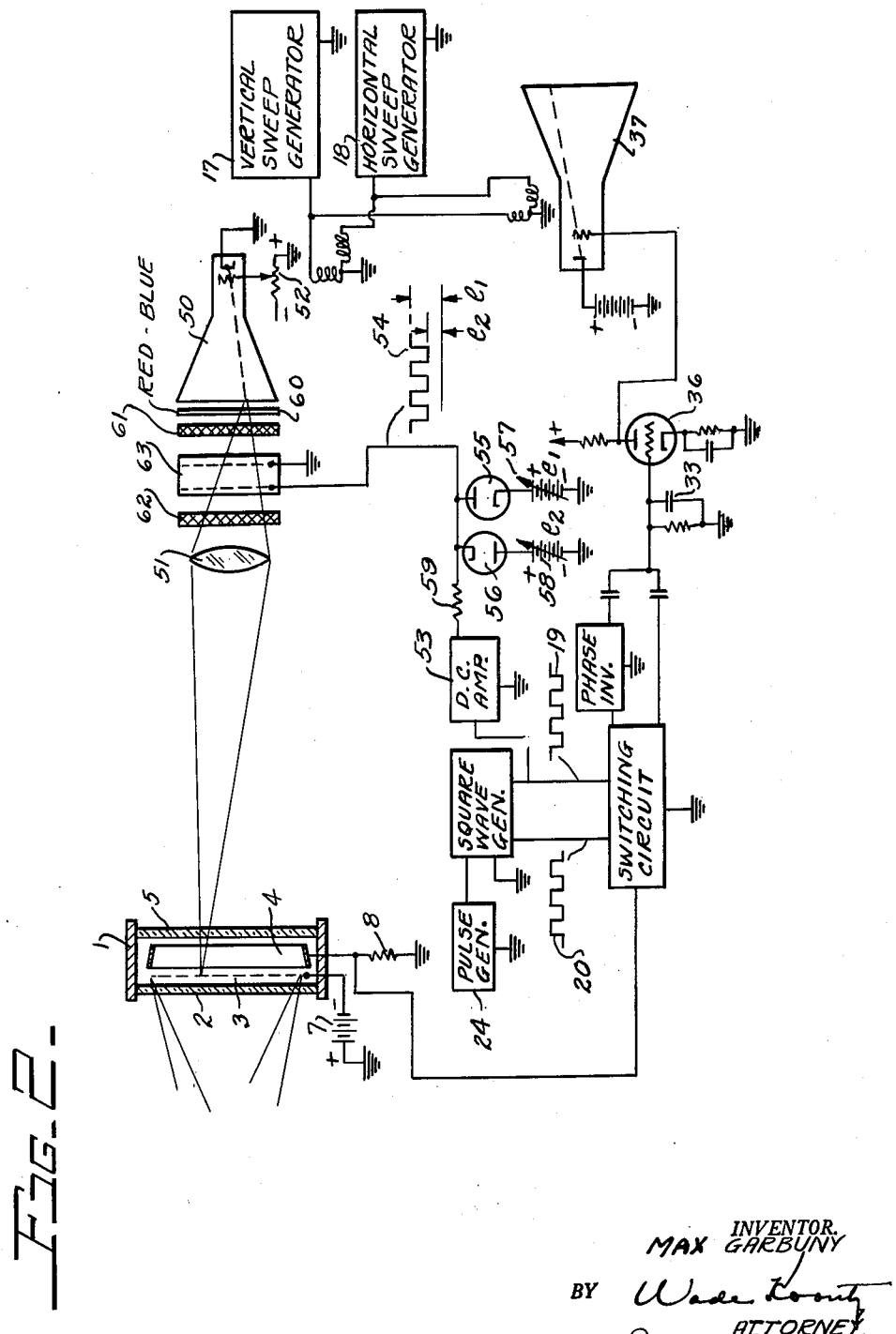

The embodiment of FIG. 2 is similar to that of FIG. 1 except for the method of switching between red and blue illumination. In FIG. 2 a single cathode ray tube 50 is the source of the scanning spot of light, an image of the screen of this tube being formed on the right-hand side of photocathode 3 by lens 51. The beam of tube 50 has a constant intensity at all times, the value of which may be adjusted by potentiometer 52. The beam deflection in tube 50 is synchronized with that in tube 37 by energizing the deflection systems of each from common sources as in FIG. 1. The square wave generator, the switching circuit and the phase inverter, indicated by labeled blocks in FIG. 2, correspond to the circuits containing tubes 22—23, 25—26 and 29 of FIG. 1. One output of the square wave generator of FIG. 2 is amplified by direct current amplifier 53 to produce an amplified square wave of voltage 54 having maximum and minimum values $e_1$ and $e_2$ established by limiting and clamping circuits comprising diodes 55 and 56, voltage sources 57 and 58, and resistor 59.

The phosphor of tube 50 is selected for maximum production of light at the red and blue ends of the spectrum and filter 60 favors passage of light at the ends of the spectrum. The light passing filter 60 is therefore predominantly red and blue. Interposed between filter 60 and lens 51 are two polarizers 61 and 62 and a Kerr cell 63. The directions of polarization of polarizers 61 and 62 are crossed and at an angle to the optic axis of the Kerr cell. A Kerr cell has the property of becoming doubly refracting when energized by the application of an electric potential across its electrodes. Therefore the polarized light from polarizer 61 is broken into two waves in cell 63 which travel through the cell with different velocities and emerge with one wave retarded in phase relative to the other wave. After emergence form the cell the two waves resume the same velocities and constitute light having an elliptical polarization. A special case, however, occurs when the phase retardation is 180° or 360° (0°). In this case the polarization is linear and, in the case of 360° (0°) retardation, the plane of polarization is that of the incident light. Therefore, for 360° (0°) retardation, the light emerging from cell 63 has the same direction of polarization as the light emerging from polarizer 61 and, since this direction is at right angles to the direction of polarizer 62, it is absorbed by the latter polarizer. The phase retardation angle of the Kerr cell is a function of both the energizing voltage and the wave length of the light. Therefore, for light of a given wave length the proper voltage on the Kerr cell will prevent light of that wave length from reaching lens 51.

The Kerr cell is energized by the square wave of voltage 54 having a maximum value $e_1$ and a minimum value $e_2$. If voltage $e_1$ and $e_2$ are such that the transmissions of red and blue light, respectively, are blocked in the above described manner, then red and blue light are alternately prevented from reaching photocathode 3. However, when the Kerr cell is energized at $e_1$, which produces a 360° (0°) retardation angle and therefore unchanged polarization of the red light, the retardation angle for blue light is other than 360° (0°) or 180° and therefore the blue light emerging from cell 63 is elliptically polarized. Since polarizer 62 will not totally block the passage of elliptically polarized light, blue light reaches photocathode 3 when the Kerr cell is energized at $e_1$. Similarly, when the cell is energized at $e_2$, red light reaches the photocathode. Therefore, alternate red and blue illuminations of the photocathode occur as in FIG. 1. In all other respects the operation of FIG. 2 is the same as in FIG. 1.

I claim:
1. A thermal image converter comprising a thermally sensitive photoemissive cathode having a threshold wave length above which its photoemissivity is a function of temperature and below which its photoemissivity is substantially independent of temperature, means for forming an infrared image on said cathode, a pair of cathode-ray tubes having fluorescent screens, means causing the beams of said tubes to scan said screens in synchronism, means forming superimposed images of said fluorescent screens on said cathode, means restricting the light in one of said superimposed images to light of a wave length greater than said threshold wave length and means restricting the light in the other of said superimposed images to light of a wave length less than said threshold wave length, means normally biasing the beams in said tubes to cut-off, unblanking means for alternately turning on the beams in said tubes for equal short intervals, means for collecting the photoelectrons resulting from the light of both wave lengths in said superimposed images to produce a video signal, means synchronized with said unblanking means for producing a second video signal equal to the difference between that part of the video signal attributable to said light of greater wave length and that part of the video signal attributable to said light of lesser wave length, and means synchronized with the scanning means of said pair of cathode ray tubes for producing a visual image of said second video signal.

2. Apparatus as claimed in claim 1 in which the last means is a third cathode-ray tube having the scanning of its fluorescent screen by the beam synchronized with that of said pair of cathode-ray tubes and having a beam intensity control electrode to which said second video signal is applied.

3. A thermal image converter comprising a thermally sensitive photoemissive cathode having a threshold wave length above which its photoemissivity is a function of temperature and below which its photoemissivity is substantially independent of temperature, said threshold wave length lying between the wave lengths of red and blue light, means for forming an infrared image on said cathode, a cathode-ray tube having a fluorescent screen of a material that fluoresces predominantly at red and blue wave lengths, means maintaining the beam of said tube at constant intensity, means causing said beam to scan said screen, means forming an image of said screen on said cathode, a red-blue filter, a first polarizer, a Kerr cell and a second polarizer crossed relative to said first polarizer arranged in the order named between said screen and said image forming means, means for alternately energizing said Kerr cell for equal short intervals at first one and then the other of two predetermined voltages one of which has such value that the direction of polarization of red light is unaffected by said cell and the other of which has such value that the direction of polarization of blue light is unaffected by said cell, means for collecting photoelectrons emitted by said cathode to produce a video signal, means synchronized with said Kerr cell energizing means for producing a second video signal equal to the difference between the video signal occurring when said cell is energized at one of said predetermined voltages and the video signal occurring when said cell is energized at the other of said predetermined voltages, a second cathode-ray tube having a beam intensity control electrode and a fluorescent screen, means causing the beam of said second tube to scan said screen in synchronism with the beam of the first mentioned cathode-ray tube, and means for applying said second video signal to the beam intensity control electrode of said second cathode-ray tube.

4. A thermal image converter comprising a thermally sensitive photoemissive cathode having a threshold wavelength above which its photoemissivity is a function of temperature and below which its photoemissivity is substantially independent of temperature, means for forming an infrared image on said cathode, means for periodically scanning said cathode with a small spot of light, means for alternately switching the wave length of the scanning spot between a value above and a value below said threshold wave length at a sufficiently high rate that the distance moved by said spot during one complete wave length switching cycle is small relative to the size of said spot, means for collecting the photoelectrons resulting from the scanning of said cathode to produce a video signal, means synchronized with said switching means for deriving from said video signal a second video signal proportional to the difference between the video signal produced when said scanning spot wavelength is above said threshold value and the video signal produced when said scanning spot wavelength is below said threshold value, and means synchronized with said scanning means for producing a visual image from said second video signal.

References Cited in the file of this patent

UNITED STATES PATENTS 2,929,868     Leiter _____ Mar. 22, 1960